United States Patent [19]

Gallivan

[11] Patent Number: 5,033,228

[45] Date of Patent: Jul. 23, 1991

[54] TACKLE HOLDER FOR FISHERMEN

[76] Inventor: Richard T. Gallivan, 3668 Wenbrook Dr., Kettering, Ohio 45429

[21] Appl. No.: 412,114

[22] Filed: Sep. 25, 1989

[51] Int. Cl.⁵ .......................................... A01K 97/00
[52] U.S. Cl. ............................. 43/54.1; 242/118.41; 242/137; 242/137.1
[58] Field of Search ............ 43/54.1; 242/137, 137.1, 242/47, 118.41

[56] References Cited

U.S. PATENT DOCUMENTS

| | | | |
|---|---|---|---|
| 96,530 | 11/1869 | Woolston | 242/137 |
| 1,976,037 | 10/1934 | Rawlings | 242/137 |
| 2,517,866 | 8/1950 | Glahn | 242/137.1 |
| 3,284,025 | 11/1966 | Fridolph | 242/137 |
| 3,430,886 | 3/1969 | Sweeney | 242/118.41 |
| 3,962,815 | 6/1976 | Christensen | 43/54.1 |
| 3,991,507 | 11/1976 | Bart | 43/54.1 |
| 4,290,223 | 9/1981 | Ostenberg et al. | 242/137.1 |
| 4,555,862 | 12/1985 | Panasewich | 43/54.1 |
| 4,708,244 | 11/1987 | Fish et al. | 242/137.1 |
| 4,791,752 | 12/1988 | Van Kampen | 43/54.1 |

Primary Examiner—Kurt Rowan
Attorney, Agent, or Firm—Donald P. Gillette

[57] ABSTRACT

A holder for a plurality of leaders, said holder comprising:
(a) a housing comprising:
  (i) hollow tubular means, and
  (ii) first and second axially spaced walls extending transversely across the tubular means, at least the first wall having a central aperture through it;
(b) a rotatable assembly rotatably enclosed within the tube with at least a major part of the assembly between the walls, the assembly comprising:
  (i) an axle, one end of which extends through the aperture in the first wall,
  (ii) a plurality of spools rotatably mounted on the axle,
  (iii) engagement means on each of the spools to engage a leader, and
  (iv) frictional torque-transmission means to couple each of the spools separately to the axle, whereby part of the torque applied to rotate the axle in a winding direction is transmitted to each of the spools to wind a leader on that spool; and
(c) braking means to allow each spool to be rotated on the axle in the opposite, or unwinding, direction to unwind the leader on that spool without rotating any of the other spools in the unwinding direction.

24 Claims, 2 Drawing Sheets

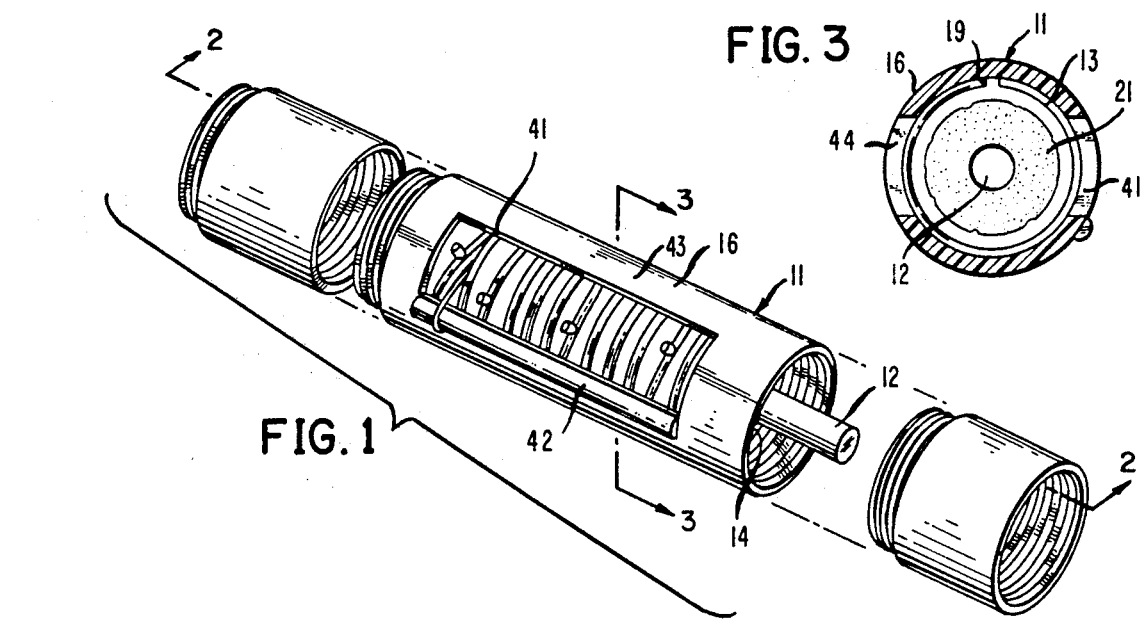
FIG. 1
FIG. 3
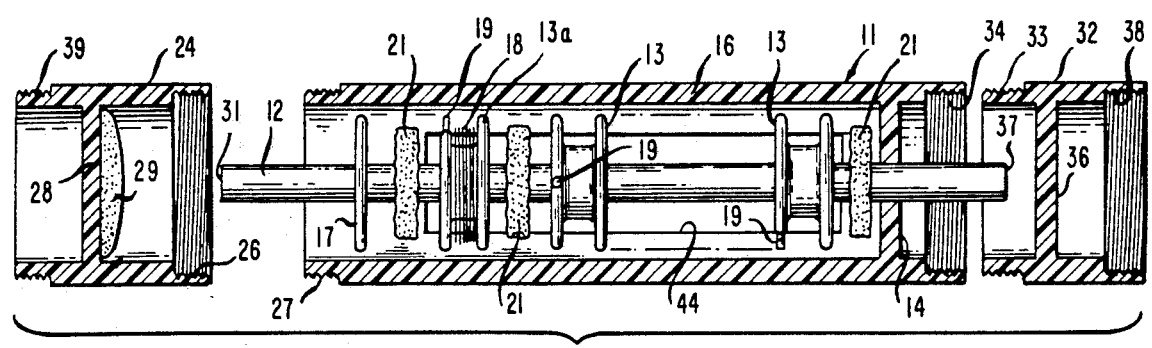
FIG. 2
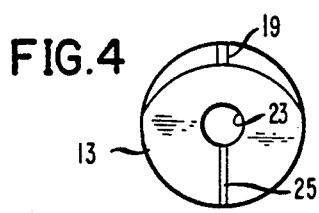
FIG. 4
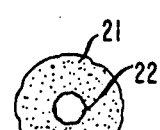
FIG. 5
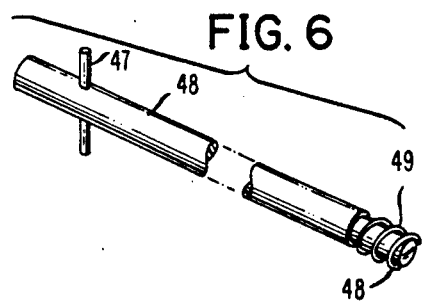
FIG. 6
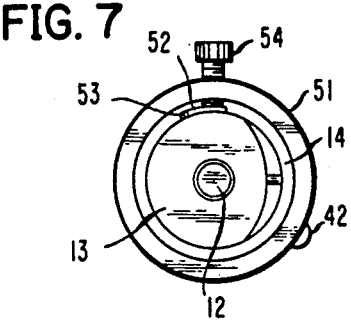
FIG. 7
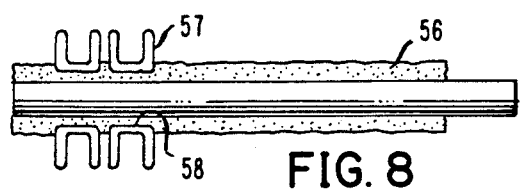
FIG. 8

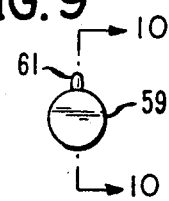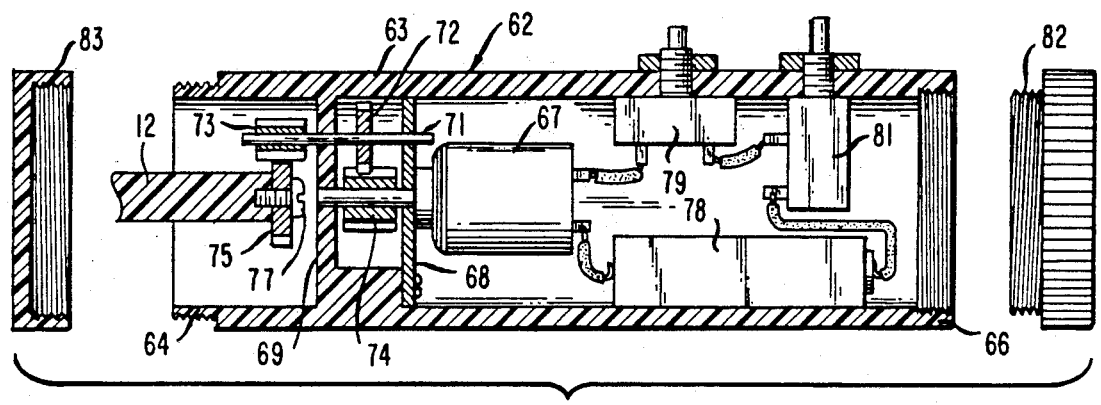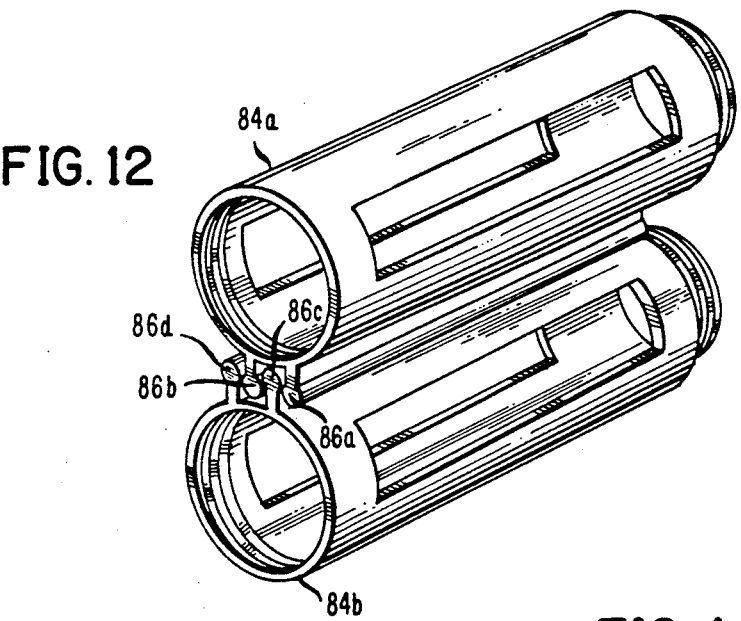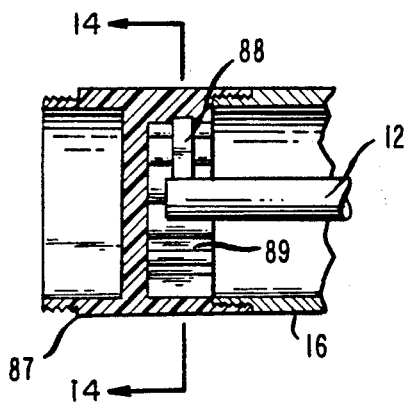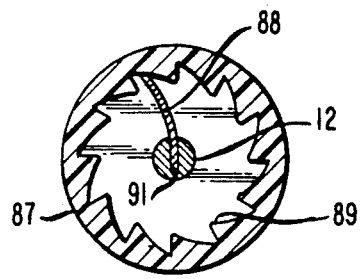

TACKLE HOLDER FOR FISHERMEN

BACKGROUND OF THE INVENTION

This invention relates to a storage unit for conveniently holding fishing tackle. In particular, it relates to a storage unit for holding leaders with hooks and pre-tied flies and other lures so that they can be easily stored and easily retrieved for use.

Sport fishermen are aware that it may be necessary to use a number of different means to lure fish to a hook during a single fishing expedition. In the case of fly fishing, this means that different flies are likely to be required according to the types of fish expected to be caught, the time of day, the weather conditions, the environmental conditions of the location, and other factors. Not only is it necessary to be prepared to use different flies, but the lines to which the flies are connected may also be different in thickness and, therefore, in strength, ranging from a very slender line that the fish cannot see easily but that will break in response to a stress corresponding to a weight of only two pounds up to a much thicker line capable of withstanding many pounds of stress.

The equipment that turns out to be needed on a fishing trip cannot always be anticipated in advance, and many fishermen carry a number of poles, lines, and flies. If they don't, they must be prepared to tie the flies at the fishing location and connect them to their line on the spot. The necessity to stop fishing to tie and attach a new fly under such circumstances is an unpleasant interruption in the time available to try to catch fish. Furthermore, trying to make the necessary adjustments and changes while at the fishing location is frequently all but impossible. Having several sets of complete equipment to make it possible to drop one and immediately pick up another not only requires carrying all of that equipment to the fishing location, with the strong likelihood that some of it may not be used and that other equipment not brought may turn out to be preferred, but also requires a substantial expenditure for essentially duplicate equipment. Even if several flies are pre-tied and attached to short leaders that are to be connected to the end of the main line on a pole, it is essential that the leaders, or snells, be stored easily in a way that allows any one of them to be available with a minimum of effort so as to be ready for immediate attachment to a main line.

Tackle boxes and other containers to hold extra leaders, hooks, flies and other tackle are well known. However, none of those available are arranged to receive leaders easily and in a manner that makes any one of the leaders accessible separately from the others.

U.S. Pat. Nos. 920,663 to Schaney and 2,422,570 to Willis show reels for receiving a number of leaders with hooks, each hook being joined to the loop in the leader attached to the preceding hook, so that they can only be wound and unwound in sequence.

Glahn shows a container in U.S. Pat. N. 2,517,867 for separate reels on which leaders have been wound and from which they may be extracted by pulling on their ends, which are hooked onto fingers on the outer surface of the container. No access is provided for attaching individual leaders to their respective reels after the container has been assembled, nor is any structure provided for turning all of the reels in the same direction to wind leaders on them.

Several forms of a simple structure consisting, essentially, of a single cylinder with spaces on which to wind separate leaders are shown in the following U.S. Pat. Nos.:

2,596,896 Goad
2,716,302 Dutton
2,743,546 Crist
2,789,389 Moen
4,631,856 Born
4,791,752 Van Kampen.

Anderson, in U.S. Pat. Nos. 2,667,010 and 2,670,563, and Losowy, in U.S. Pat. No. 2,924,908, show holders in which snelled fishhooks are stored without being wound on a rotatable reel.

Adamek shows a container with multi-level means for holding a number of hooks with flies in U.S. Pat. No. 2,675,640.

In U.S. Pat. No. 3,039,226, Bagdonas shows a reel with several locations that can be engaged by hooks attached to different leaders, but all of the leaders are wound on the same reel and cannot be separately disengaged from the reel without disturbing any of the others. The holder may be made in modular form, but each reel module is like all the others and holds several leaders. There is no common winding means operable, on the one hand, to wind a leader without disturbing any previously wound leaders and, on the other, separately operable to allow any individual leader to be unwound, also without disturbing others.

In U.S. Pat. No. 3,464,143, Scott shows a reel with a number of slots in which to engage fishhooks. After each hook is engaged, the leader attached to it is wound on the reel and then the free end of the leader forced into a tight-fitting slit. The leaders are not attached to each other, but they have to be unwound in reverse order to the order in which they were put on. They cannot be unwound in any other order to allow the fisherman to choose which leader to use next.

Synstellen et al. describe, in U.S. Pat. No. 4,200,249, a fishhook and leader storage unit for storing only one leader on a reel. While several such units may be clipped onto a fisherman's belt, there is no operative connection between them.

OBJECTS AND SUMMARY OF THE INVENTION

It is one of the objects of this invention to provide for storing several leaders on separate spools, all connected together to be wound as a unit but each joined to the others by frictional means to allow slippage so that any leaders that have been fully wound on their spools will not be affected by the winding of subsequent leaders and, when any one of the leaders is being unwound, none of the others will be.

Further objects will become apparent to those skilled in the art after studying the following description and the accompanying drawings.

The storage unit according to this invention has several spools mounted for rotation on a common axis and drive means to rotate all of them in the same direction to wind fishing leaders on each spool separately. After each spool has a leader wound on it, it is locked in place to hold that leader still while other leaders are wound on other spools. The drive means includes frictional means to allow some slippage so that any of the spools that are locked in place can remain in that position while other spools are having leaders wound on them. Conversely, if it is desired to remove the leader wound on any one of the spools without unwinding the leader on any other spool, the frictional drive means provides for enough slippage to permit this to be done. Additional means may be included to prevent the spools from being rotated in the direction to unwind the leader wound thereon while another leader is being unwound from another spool.

BRIEF DESCRIPTION OF THE DRAWINGS

FIG. 1 is a perspective view of a tackle storage unit according to this invention with end caps removed from the main part.

FIG. 2 is a cross-sectional view of the storage unit in FIG. 1 taken along the line 2—2 in FIG. 1.

FIG. 3 is a cross-sectional view of the storage unit in FIG. 1 taken along the line 3—3 in FIG. 1.

FIG. 4 shows one of the spools in FIGS. 1-3.

FIG. 5 is a side view of one of the washers in FIGS. 2 and 3.

FIG. 6 shows a modified axle and stop.

FIG. 7 shows a different brake to restrain rotation of the spools.

FIG. 8 shows a different axle and frictional drive arrangement.

FIG. 9 is an end view of a modified axle and frictional drive structure.

FIG. 10 is a cross-sectional view of the axle and drive structure in FIG. 9.

FIG. 11 is a cross-sectional view of a motorized drive unit for use with the holder shown in FIGS. 1-3.

FIG. 12 is a perspective view of modified housings for fishing leader holders.

FIG. 13 is a cross-sectional view of a structure for limiting the axle in FIG. 2 to one direction of rotation.

FIG. 14 is a cross-sectional view of the one-way rotational structure in FIG. 13 along the line 14—14 in FIG. 13.

DETAILED DESCRIPTION OF THE INVENTION

FIGS. 1-5 show a holder 11 and its components for conveniently carrying fishing leaders and other small items of tackle. The holder includes an axle 12 with a number of spools 13 rotatably mounted on it. The axle is journaled in a central hole in a transverse wall 14 near one end of a tubular housing 16, and the diameters of the spool flanges are close enough to the inner diameter of the housing to serve as further bearing means for the axle. In addition, a stop 17 in the form of a disc rigidly mounted on the axle can also serve as a bearing for the axle. The axle 12 can be molded of plastic material with the stop integrally molded with it. The spools 13 and the housing 16, together with the parts to be screwed onto it, as will be described hereinafter, may also be molded of plastic.

Each spool 13 has enough space between its flanges to allow a leader, such as the leader 18 on the spool 13a, to be wound on it. In addition, each spool also has means, such as a small projection 19, to engage the loop usually found at one end of each leader.

In this embodiment, there is a washer 21 of foam rubber or the like on each side of each of the spools to transfer torque from the axle 12 to the spools. To perform this task, each washer has a central hole 22 considerably smaller in diameter than the diameter of the axle, while the central hole 23 through each spool 13 is slightly larger than the diameter of the axle 12. In the absence of any drag, the washers rotate with the axle.

The frictional engagement between the axle 12 and the washers 21 is only part of the means for transmitting torque from the axle to each spool. An end cap 24 that is threaded at one end 26 to engage the threaded end 27 of the housing 16 has a transverse wall 28 to which is affixed a friction pad 29 of foam rubber or the like. When the end cap 24 is screwed onto the end of the housing, the pad 29 is forced against the end 31 of the axle 12, pushing the stop 17 against the first washer 21 and pressing the latter against the first spool 13a. That spool transmits some of the pressure to the next washer, which, in turn, presses on the next spool, and so on to the last washer, which presses against the wall 14. The pressure between each spool 13 and the washers 21 on each side is controlled by the extent to which the end cap 24 is tightened on the housing 16 and is adjusted to cause the frictional engagement between the washers and spools to rotate the spools 13 when the washers 21 are rotated by the axle 12. This axially directed pressure on the washers also presses them radially inward on the axle 12 and thereby increases their frictional engagement with it. The frictional engagement between each spool 13 and the washers 21 on each side of it may be increased by roughening the end surfaces of the spool, such as by putting a slightly indented groove 25, shown in FIG. 4, on the end surfaces.

A second end cap 32 at the other end of the housing 16 is threaded at one end 33 to engage the adjacent threaded end 34 of the housing 16 and has a transverse wall 36. The other end 38 of end cap 32 is also threaded so that, when the holder is to be put into use, that cap can be removed and screwed onto the other end 39 of the end cap 24 for temporary storage. This makes the end 37 of the axle 12 available to be turned to wind one leader after another on individual spools 13. Extra end caps like 24 and 32 can be added to the assemblage to provide small containers for tackle.

In order to provide access to the spools, the housing 16 has at least one window 41 that extends over enough of the length of the housing to expose every spool in the housing. To wind a leader on a spool, the user will hook the loop at the end of the leader on the projection 14 on one of the spools 13 and will grasp the end 37 of the axle 12 and turn it. The winding direction has to be the same for all spools in the housing 16, and this embodiment is arranged so that clockwise rotation of the axle is the preferred winding direction. When the first leader is fully wound on any one of the spools 13, the hook at the end of that leader is to be stuck into a retainer 42, which may be a strip of cork or any other component to hold the hook stationary.

The loop at the end of a second leader can then be placed over the projection 14 of any other spool 13, and the axle 12 can be turned in the winding direction, as before, to wind the second leader on its spool. Because the hook of the first leader is caught on the retainer 42, the first spool cannot be turned in the winding direction, so slippage will occur between that spool and the washers 21 on each side of it or between these washers and the axle 12. However, this does not affect the ability of any other washers 21 to transmit torque by frictional engagement with the spools 13 with which they are engaged.

Winding other leaders can continue in the same way until all of the spools have a leader on them. Each leader is visible through the window 41, but the housing 16 may also have a strip 43 on which the user can write the weight or some other identification of the leader.

The housing 16 in this embodiment is also provided with a second window 44 on the opposite side from the window 41, and the user can rotate each spool 13 in the winding direction by finger pressure against the back side of the spool. This direct rotation of one spool will cause torque to be transmitted from that spool to the washers 21 on each side of it, and, if they are free to turn, this torque will be transmitted by them to the axle 12 to turn any other spools that are free to turn, unless the pad 29 is exerting too much braking force to allow the axle to turn. Such direct manipulation of one spool to load it will have no effect on any spools already loaded. When all of the spools to be loaded have been, the end cap 32 should be screwed onto the end 34 of the housing 16. Alternatively, since all of the threads on the housing and the end caps are matching types, a second housing can be joined to either end of the housing 16 by means of one of the end caps 24 or 32, and any number of such housings can be so connected.

When a leader is to be removed from one of the spools, the hook attached to that leader must be disengaged from the retainer 42. Then the hook can be pulled to draw out the leader, thereby rotating in the unwinding direction the spool 13 on which that leader is wound. If the end cap 24, which may be referred to as a tension cap, has been screwed onto the housing 16 with the proper degree of tightness, the braking action of the pad 29 on the axle 12 will prevent any torque transmitted to the axle by the washers 21 on each side of the spool rotating in the unwinding direction from being transmitted to any other spool. If the end cap 32 has been removed, the user can hold the end 37 of the axle to keep it from rotating in the unwinding direction or can increase axial pressure on all the spools by further tightening end cap 24. Any leader on any of the spools 13 can be unwound in any order without disturbing any of the other spools and leaders.

FIG. 6 shows a modified form of axle 46. This axle has a pin 47 through it to take the place of the stop 17 in FIG. 2. A compression spring 48 at the end 49 of the axle 46 presses against the wall 36 when the axle is used in the housing 16 and the end cap 32 is attached. The spring provides for a constant release of tension when the cap 24 is unscrewed.

In the end view of the modified housing 51 in FIG. 7, a flap 52 that extends alongside all of the spools 13 is used as a brake that directly presses against all of them. The flap has a pivot pin 53 by which it is hinged in the wall 14 in the housing, and a set screw 54 through the wall of the housing engages the flap and can be adjusted to set the braking force to be applied to the spools.

Instead of using a friction washer on each side of each spool, a friction sleeve 56 of foam rubber or the like may be placed over the axle 12, as shown in FIG. 8. In order to fit on the sleeve, the spools 57 used with it have central holes 58 that are somewhat larger than the central hole 23 in the spool 13 shown in FIG. 4. The frictional engagement between the sleeve 56 and the surface defining the hole 58 transmits the torque needed to wind leaders on the spools by rotation of the axle 12.

FIGS. 9 and 10 show still another form of frictional engagement means to transmit torque from the axle to the spools 13. In this embodiment, the axle 59 which is otherwise identical to the axle 12 in FIG. 1, has a resilient wire 61 inserted in holes near the ends of the region to be occupied by the spools. The wire bulges out enough to apply pressure to the surface defining holes 23 in the spools, and the frictional engagement between the wire and that surface is enough transmit the torque needed to wind leaders on the spools that have not been tied down by engagement of a hook with the retainer 42 shown in FIG. 1.

FIG. 11 shows a motor drive unit 62 for winding leaders more quickly and with less effort. The drive unit has a housing 63 threaded at each of its ends 64 and 66 to permit it to be attached to the housing 16 in FIG. 2. Within the housing 63 is a d.c. motor 67 mounted on a plate 68 attached to the housing 63 near a transverse wall 69. A shaft 71 supported by the plate and the wall has two gears 72 and 73 press-fitted on it to mesh, respectively, with a gear 74 on the shaft of the motor and another gear 75 affixed to the axle 12 of the holder by a screw 77. The gears 72–75 comprise a speed-reduction gearbox to reduce the speed of the motor shaft from a speed that is typically of the order of 4000 r.p.m. to a much slower speed, typically of the order of 250 r.p.m.

A battery power supply 78 is connected in series with an On-Off switch 79 and a trimpot resistor 81 that can further control the speed of rotation of the axle 12 within the range permitted by the motor and the gears. This is the simplest form of speed control and may be replaced by a known solid-state circuit that would allow direct drive of the axle 12 by the motor.

The drive unit 62 is preferably made water-tight by using suitable seals or snug fits around the hole in the wall 69 through which the shaft 71 passes and around the holes for the switch 79 and the trimpot 81 in the cylindrical wall of the housing 63 and by closing off the end 66 by a cap like the cap 32 in FIG. 2 or by a simple, threaded closure 82. If the unit 62 is to be carried separately, water can be kept out by screwing a cap like cap 32 or another simple closure 83 on the end 64.

FIG. 12 shows two identical housings 84a and 84b that are interchangeable with the housing 16 in FIG. 2 except that the housings 84a and 84b are molded to have mating flanges 86a–86d on them so that they can be locked together. These or other forms of interlocking flanges can be used to connect two or more housings together to form a package that can be carried and stored conveniently.

FIG. 13 shows an end cap 87, which is a modified form of the end cap 24 in FIG. 2, screwed onto the end 27 of the housing 16. The end cap 87 has means for limiting the rotation of the axle 12 to one direction, the winding direction as described in connection with FIGS. 1-3. The limiting means are a form of pawl and ratchet, with the pawl 88, in this embodiment, being the rotating member attached to the axle 12 and the ratchet being an internal serrated surface 89 molded on the inner surface of the plastic end cap 87. The pawl 88 is a resilient blade that may be molded as part of the axle 12 or may be a separate member inserted in a notch 91 in the end 31 of the axle, as shown in FIG. 14. The pawl is flexible enough to slide past the serrations of the ratchet as the axle 12 rotates clockwise from the position shown in FIG. 14 but stiff enough to engage the steeper side of the serrations and prevent the axle from rotating counterclockwise. The axle 12 can rotate clockwise to wind leaders on the spools 13 (see FIG. 2) but cannot be rotated in the unwinding direction when any of the leaders are pulled from the spools on which they are wound. This eliminates the need for a brake pad, such as the pad 29 in FIG. 2, and allows the axial pressure on the washers 21 to be set entirely with regard to transmitting winding torque to the spools 13 and without any regard to reverse rotation of the axle 12.

While this invention has been described in terms of specific structures, it will be understood that modifications may be made therein without departing from the scope of the invention.

What is claimed is:

1. A holder for a plurality of leaders, said holder comprising:
   (a) a housing comprising:
      (i) hollow tubular means, and
      (ii) first and second axially spaced walls extending transversely across the tubular means, at least the first wall having a central aperture through it;
   (b) a rotatable assembly rotatably enclosed within the tube with at least a major part of the assembly between the walls, the assembly comprising:
      (i) an axle, one end of which extends through the aperture in the first wall,
      (ii) a plurality of spools rotatably mounted on the axle,
      (iii) engagement means on each of the spools to engage a leader, and
      (iv) frictional torque-transmission means to couple each of the spools separately to the axle, whereby part of the torque applied to rotate the axle in a winding direction is transmitted to each of the spools to wind a leader on that spool; and
   (c) braking means to allow each spool to be rotated on the axle in the opposite, or unwinding, direction to unwind the leader on that spool without rotating any of the other spools in the unwinding direction.

2. The holder of claim 1 in which the housing comprises an elongated opening extending along the part of its length in which the spools are located, whereby one end of each leader can be inserted through the opening and connected to the engagement means of one of the spools to wind that leader on that spool by rotation of the axle in the winding direction.

3. The holder of claim 2 comprising hook-engaging means alongside the opening to engage a hook on each leader when that leader is fully wound on the respective spool.

4. The holder of claim 2 comprising a second elongated opening in the opposite side of the tube from the first-named opening to give access to the opposite sides of each of the spools to facilitate beginning the winding of each leader thereon.

5. The holder of claim 1 in which the tubular means comprises:
   (a) a main tubular portion threaded at each end, one of the walls being in that portion and closer to a first end thereof than to a second end; and
   (b) a second tubular portion threaded at its first and second ends, the first end of the second portion threadedly engaging the second end of the main portion, the other wall being in the second portion, the distance between the walls being controlled by the extent to which the main and second tubular portions are threaded together.

6. The holder of claim 5 comprising, in addition: a third portion threaded at its first end and at its second end and having a third wall across it intermediate its first and second ends, the first end of the third portion being threadable onto the first end of the main portion to enclose the end of the axle extending through the aperture in the first wall, at least one of the ends of the third portion being threadably engageable with the second end of the second portion, whereby the second portion serves as a holder for the third portion when the third portion is removed from the main portion to expose the end of the axle extending through the apertured wall.

7. The holder of claim 1 in which at least one of the walls is axially movable relative to the other to change the fraction of torque transmitted to each of the spools from the axle.

8. A holder for a plurality of leaders, said holder comprising:
   (a) an axle;
   (b) support means rotatably supporting the axle;
   (c) a plurality of spools, each having a wall defining a central opening of larger diameter than the axle, the spools being rotatably mounted on the axle;
   (d) engagement means on each of the spools to engage a leader;
   (e) frictional driving means to connect each of the spools to the axle to be separately driven thereby, whereby rotation of the axle in one direction is transmitted to each of the spools to wind a leader on that spool; and
   (f) restraining means to restrain each spool, after a leader has been wound thereon, from being rotated in the opposite direction by rotation of another spool in said opposite direction, the restraining means allowing each spool to be rotated on the axle in said opposite direction by direct force on that spool to unwind the leader on that spool while restraining all of the other spools from rotating in said opposite direction.

9. The holder of claim 8 in which the restraining means engages the axle to exert drag on it to restrain rotation of the axle.

10. The holder of claim 9 in which the support means comprises a wall, and the restraining means comprises compressible material engaging the axle and the wall to exert controllable force on the axle to restrain rotation thereof.

11. The holder of claim 10 in which the wall is perpendicular to the axle, and one end of the axle is near the wall and movable axially with respect thereto to vary the drag on the axle by the compressible means.

12. The holder of claim 9 in which the restraining means comprises ratchet means and pawl means, one of the means in this claim being connected to the axle to rotate with it and the other of the means in this claim being connected to the support means to engage said one of the means to prevent rotation of the axle in the unwinding direction.

13. The holder of claim 12 in which the pawl comprises a resilient blade extending from the axle, the support means comprises a molded tubular shell, and the ratchet comprises inwardly directed serrations molded in the inner wall of the shell.

14. The holder of claim 8 in which the restraining means extends parallel to the axle and is movable toward and away from the spools to engage the spools and exert drag directly on the spools.

15. The holder of claim 8 in which the frictional driving means comprises an elongated, resilient member attached to the axle to rotate with it and extending radially outward from the axle and frictionally engaging the wall defining the central opening in each spool.

16. The holder of claim 15 in which the frictional driving means is an elongated, resilient wire that extends generally along the axle, the ends of the wire being held by the axle at locations spaced apart by a distance greater than the combined axial length of all of the spools.

17. The holder of claim 16 in which the frictional driving means is an elongated, spongy-textured member long enough to engage all of the spools simultaneously.

18. The holder of claim 17 in which the elongated, spongy-textured member is a hollow tube that fits closely around the axle and extends outwardly against the wall defining the central aperture of each spool.

19. The holder of claim 8 comprising:
 (a) a rotational assembly comprising:
  (i) the axle,
  (ii) stop means attached to the axle to rotate with it, and
  (iii) torque-transmitting means connecting the stop means to one of the spools to transmit torque to that spool from the axle to rotate that spool unless it is held against rotation.

20. The holder of claim 19 in which the torque-transmitting means comprises an axially compressible member mechanically connected to the stop means to be rotated by it in the winding direction and frictionally engaging the spool to transmit torque from the axle to the spool to wind a leader on the spool.

21. The holder of claim 20 in which the axially compressible member is an annular disk of spongy texture having a central hole of smaller diameter than the diameter of the axle, whereby torque is transmitted to the disk by frictional engagement between the axle and the inner surface defining the central opening in the disk, the amount of torque transmitted to the disk being related to the extent to which the disk is compressed.

22. The holder of claim 21 in which the torque-transmitting means comprises a further plurality of axially compressible members, at least one of the further plurality of axially compressible members being between each pair of spools.

23. The holder of claim 22 in which each of the plurality of axially compressible members comprises a spongy-textured annular disk, each threaded on the axle between a pair of the spools and frictionally engaging juxtaposed walls of proximal spools to transmit torque thereto, the amount of torque transmitted by each disk being controlled by the amount of axial compression of that disk.

24. A holder for a plurality of leaders, said holder comprising:
 (a) main tubular housing means;
 (b) an axle rotatably supported in the housing means;
 (c) a plurality of spools rotatably mounted on the axle and located within a first part of the housing means, each of the spools comprising leader-engaging means to engage a leader;
 (d) a battery-powered motor;
 (e) means connecting the motor to the axle to rotate the axle in a first, or winding, direction to wind a leader attached to any of the spools on that spool; and
 (f) frictional coupling means connecting each of the spools to the axle to transfer rotational torque from the axle to all of the spools to rotate them in the winding direction and to allow any one of the spools to roatate in the opposite, or unwinding, direction to unwind the leader wound thereon without unwinding any of the other spools.

* * * * *